US011287105B2

United States Patent
Nakabayashi et al.

(10) Patent No.: US 11,287,105 B2
(45) Date of Patent: Mar. 29, 2022

(54) LIGHT EMITTING MODULE AND PLANAR LIGHT SOURCE

(71) Applicant: NICHIA CORPORATION, Anan (JP)

(72) Inventors: Takuya Nakabayashi, Tokushima (JP); Toru Hashimoto, Tokushima (JP); Keiji Emura, Anan (JP)

(73) Assignee: NICHIA CORPORATION, Anan (JP)

(*) Notice: Subject to any disclaimer, the term of this patent is extended or adjusted under 35 U.S.C. 154(b) by 0 days.

(21) Appl. No.: 17/169,016

(22) Filed: Feb. 5, 2021

(65) Prior Publication Data

US 2021/0247052 A1    Aug. 12, 2021

(30) Foreign Application Priority Data

Feb. 7, 2020   (JP) .............................. JP2020-019418
Oct. 7, 2020   (JP) .............................. JP2020-169826

(51) Int. Cl.
*F21V 5/04* (2006.01)
*F21V 13/14* (2006.01)
(Continued)

(52) U.S. Cl.
CPC .............. *F21V 5/045* (2013.01); *F21V 5/007* (2013.01); *F21V 13/14* (2013.01); *F21Y 2105/16* (2016.08);
(Continued)

(58) Field of Classification Search
CPC ......... G02F 1/133603; G02F 1/133605; G02F 1/133606; G02F 1/133607;
(Continued)

(56) References Cited

U.S. PATENT DOCUMENTS 5,779,337 A * 7/1998 Saito .................... G02B 6/0038
                                                    362/619
7,654,687 B2 * 2/2010 Tsai ..................... G02B 5/0247
                                                    362/237
(Continued)

FOREIGN PATENT DOCUMENTS

JP     2007-329114 A    12/2007
JP     2007329114 A  *  12/2007
(Continued)

OTHER PUBLICATIONS

Morita, Light Guide Plate, and Planar Light Emitting Device Equipped With IT, Dec. 20, 2007, JP-2007329114-A (Year: 2007).*

*Primary Examiner* — Jong-Suk (James) Lee
*Assistant Examiner* — James M Endo
(74) *Attorney, Agent, or Firm* — Foley & Lardner LLP

(57) ABSTRACT

A light emitting module includes: a light guide member including: an emission region defined by a sectioning groove, a light source placement part located in the emission region, and a light adjusting hole that, in a schematic top view, is located between the sectioning groove and the light source placement part; and a light source disposed in the light source placement part. A refractive index of an inside of the light adjusting hole is lower than a refractive index of the light guide member. In the schematic top view, the light adjusting hole is positioned to intersect with a first straight line connecting a center of the light source and a farthest point in the sectioning groove, the farthest point being farthest from the center of the light source.

20 Claims, 11 Drawing Sheets

(51) Int. Cl.
    *F21Y 105/16*     (2016.01)
    *F21V 8/00*     (2006.01)
    *G02F 1/1335*     (2006.01)
    *F21V 5/00*     (2018.01)
    *G02F 1/13357*     (2006.01)

(52) U.S. Cl.
    CPC ...... *G02B 6/0038* (2013.01); *G02F 1/133606* (2013.01); *G02F 1/133607* (2021.01)

(58) Field of Classification Search
    CPC ............ G02F 1/133611; G02B 6/0021; G02B 6/0038; G02B 6/0036; F21V 7/0091; F21V 7/0066; F21V 7/0083; F21V 5/007; F21V 5/002; F21V 5/045; F21V 13/14; F21Y 2105/16
See application file for complete search history.

(56) References Cited

U.S. PATENT DOCUMENTS

| | | | |
|---|---|---|---|
| 8,301,002 B2 | 10/2012 | Shani | |
| 2005/0237765 A1* | 10/2005 | Suehiro | H01L 33/54 362/611 |
| 2005/0265029 A1 | 12/2005 | Epstein et al. | |
| 2007/0147073 A1* | 6/2007 | Sakai | G02B 6/0031 362/607 |
| 2008/0266875 A1* | 10/2008 | Chang | G02F 1/133606 362/309 |
| 2009/0003002 A1* | 1/2009 | Sato | G02B 6/0043 362/341 |
| 2009/0067176 A1* | 3/2009 | Wang | G02F 1/133603 362/299 |
| 2009/0128735 A1* | 5/2009 | Larson | G02B 6/0021 349/62 |
| 2010/0128487 A1* | 5/2010 | Lin | F21V 5/04 362/311.02 |
| 2010/0201916 A1 | 8/2010 | Bierhuizen | |
| 2010/0265735 A1* | 10/2010 | Sylvester | G02B 6/0035 362/559 |
| 2011/0109839 A1* | 5/2011 | Zhu | G02F 1/133606 349/62 |
| 2012/0013811 A1* | 1/2012 | Shimizu | G02F 1/133603 348/739 |
| 2012/0069579 A1* | 3/2012 | Koh | G02B 6/0021 362/307 |
| 2012/0275139 A1* | 11/2012 | Chen | G02B 6/0025 362/97.2 |
| 2015/0260371 A1* | 9/2015 | Takatori | G02B 19/0047 362/97.1 |
| 2017/0115531 A1* | 4/2017 | Hiraka | G02F 1/133606 |
| 2018/0180249 A1* | 6/2018 | Yamada | H01L 33/62 |
| 2018/0182940 A1* | 6/2018 | Yamamoto | H01L 33/60 |
| 2018/0188608 A1* | 7/2018 | Fujii | G02F 1/133603 |
| 2018/0239076 A1* | 8/2018 | Chen | G02B 6/0021 |
| 2018/0245770 A1* | 8/2018 | Mochida | G02B 19/0028 |
| 2018/0356685 A1* | 12/2018 | Jang | G02F 1/133603 |
| 2019/0278013 A1* | 9/2019 | Huang | G02B 6/0229 |
| 2019/0294005 A1* | 9/2019 | Imada | G02B 6/00 |
| 2020/0049877 A1 | 2/2020 | Watanabe et al. | |

FOREIGN PATENT DOCUMENTS

| | | |
|---|---|---|
| JP | 2008-503034 A | 1/2008 |
| JP | 2008-059786 A | 3/2008 |
| JP | 2010-541154 A | 12/2010 |
| JP | 2018-137212 A | 8/2018 |
| KR | 2009-0117419 A | 11/2009 |
| WO | WO-2018/116815 A1 | 6/2018 |

\* cited by examiner

LIGHT EMITTING MODULE AND PLANAR LIGHT SOURCE

CROSS-REFERENCE TO RELATED APPLICATIONS

This application claims priority to Japanese Patent Application No. 2020-019418, filed on Feb. 7, 2020, and Japanese Patent Application No. 2020-169826, filed on Oct. 7, 2020, the disclosures of which are hereby incorporated by reference in their entireties.

BACKGROUND

The present disclosure relates to light emitting modules and planar light sources.

Planar light sources that employ light sources and light guide members have been used as backlights for liquid crystal displays. For planar light sources, techniques for sectioning an emission face into multiple emission regions and controlling the luminance per emission region have been developed. See, for example, Japanese Patent Publication No. 2008-59786. There is a need to reduce luminance non-uniformity in each emission region.

SUMMARY

One of the objects of certain embodiments of the present invention is to provide a light emitting module and a planar light source in which luminance non-uniformity in emission regions is reduced.

According to one embodiment, a light emitting module includes a light guide member and a light source. The light guide member has an emission region defined by a sectioning groove, a light source placement part provided in the emission region, and a light adjusting hole provided between the sectioning groove and the light source placement part in a schematic top view. The light source is disposed in the light source placement part. The refractive index of an inside of the light adjusting hole is lower than a refractive index of the light guide member. The light adjusting hole is positioned to intersect with a first straight line connecting a center of the light source and a farthest point in the sectioning groove, the farthest point being farthest from the center of the light source, in the schematic top view. The light adjusting hole has a first lateral face located closer to the light source and a second lateral face located opposite side form the first lateral face. At least one of normal lines to the first lateral face or at least one of normal lines to the second lateral face is oblique to a first direction being parallel to the first straight line. A width of the light adjusting hole in the first direction at a position on the first straight line is smaller than a width of the light adjusting hole in the first direction at a position distant from the first straight line.

According to another embodiment, a planar light source includes the light emitting module described above and a wiring substrate. The light guide member is disposed on the wiring substrate. The light source is mounted on the wiring substrate.

According to the embodiments, a light emitting module and a planar light source in which luminance non-uniformity in emission regions can be provided is reduced.

EMBODIMENTS

First Embodiment

A first embodiment will be explained first.

Figure 1:
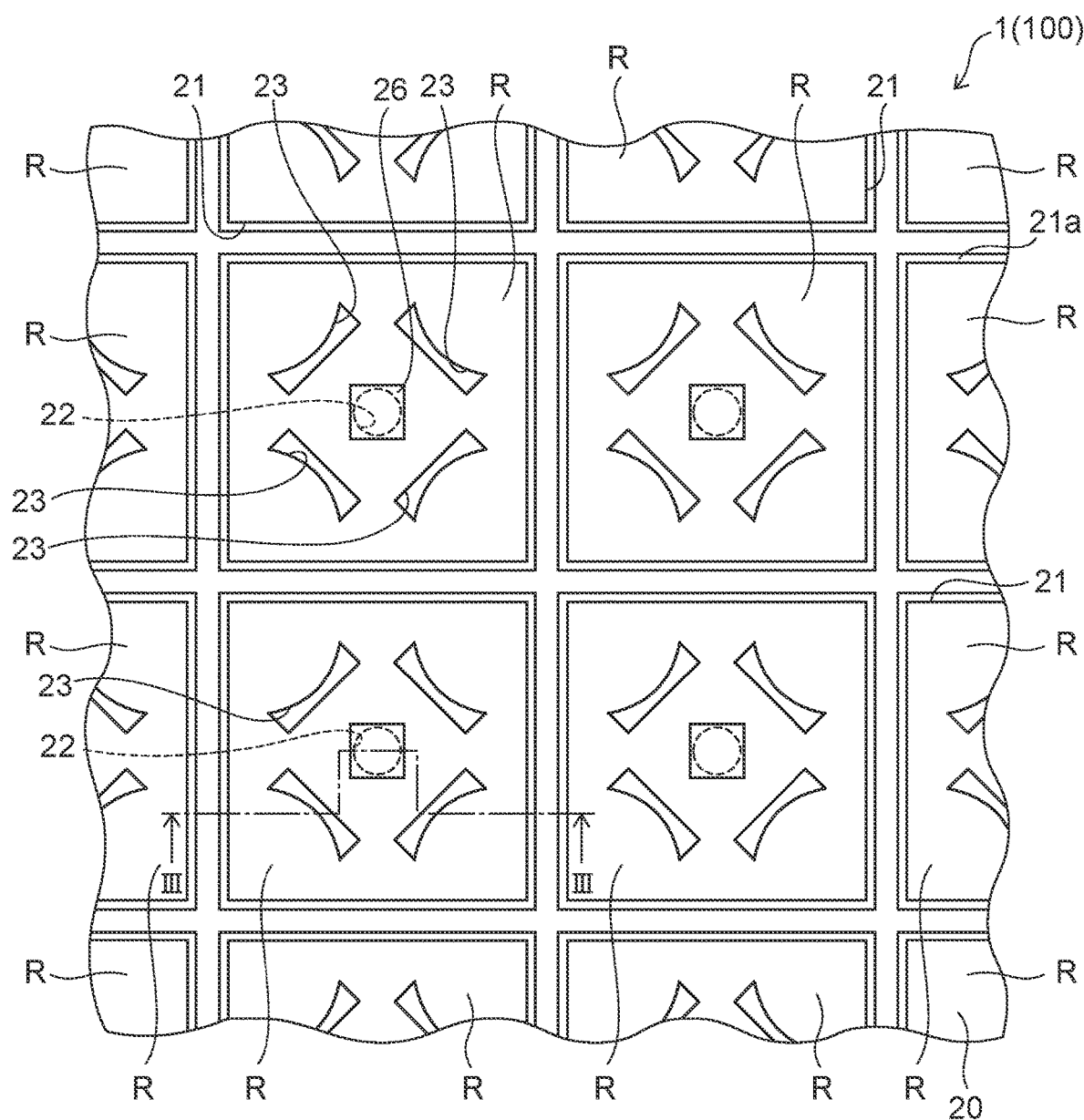
FIG. 1 is a schematic top view of a planar light source according to a first embodiment.

FIG. 1 is a schematic top view of a planar light source according to the embodiment.

Figure 2:
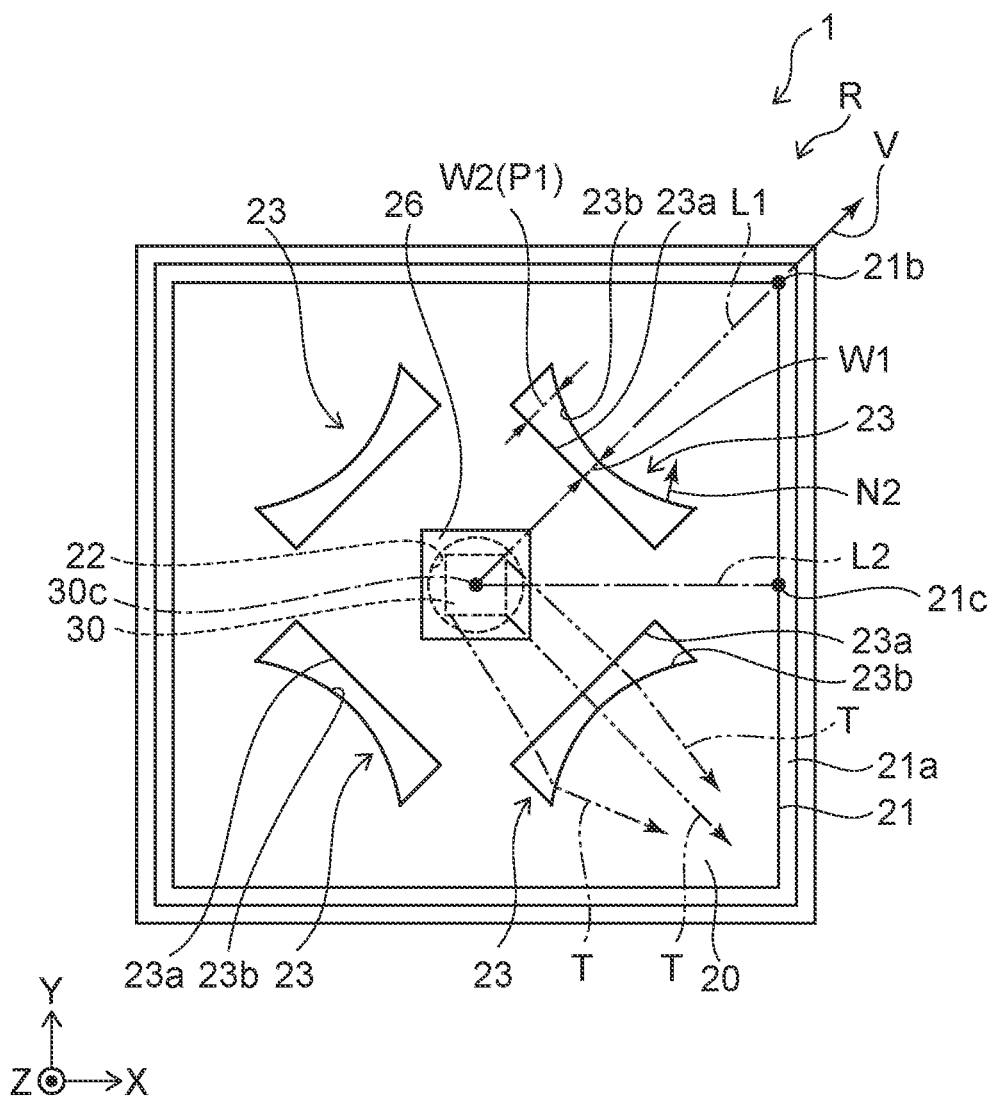
FIG. 2 is a schematic top view of an emission region of the planar light source according to the first embodiment.

FIG. 2 is a schematic top view of an emission region of the planar light source according to the embodiment.

Figure 3:
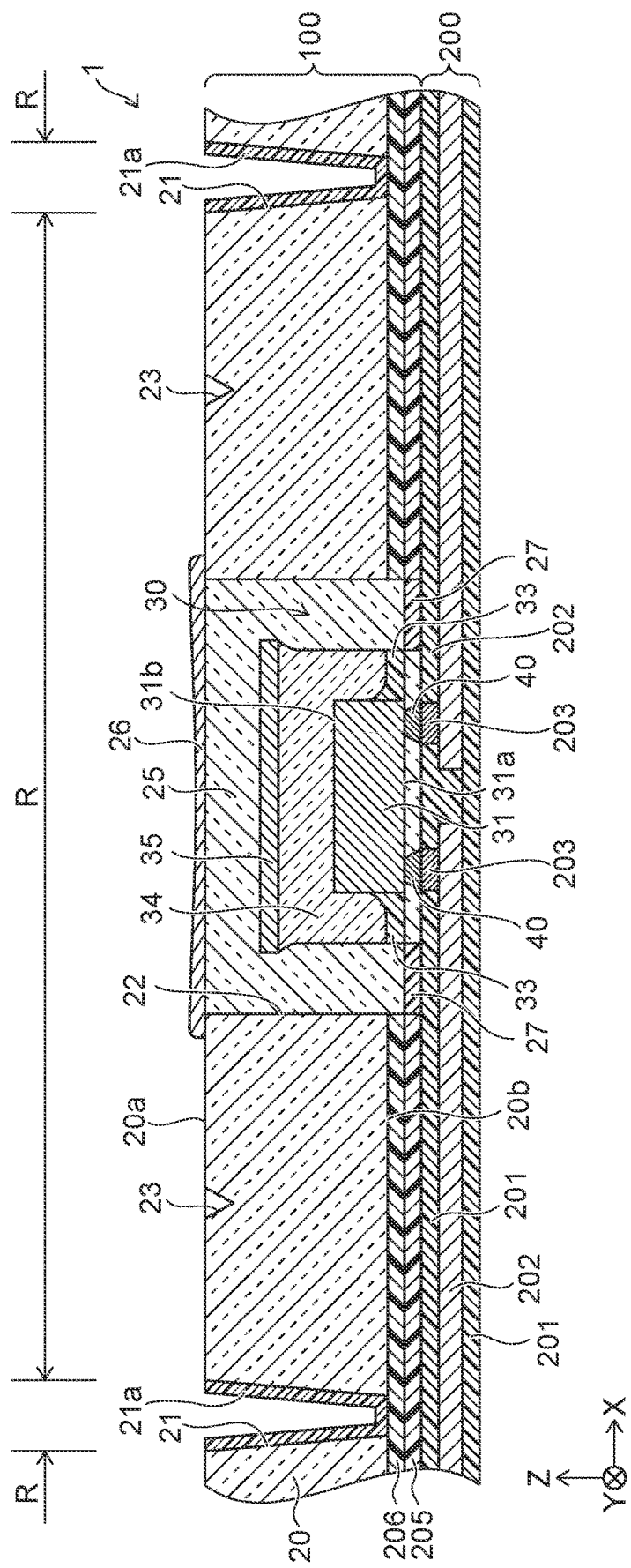
FIG. 3 is a schematic cross-sectional view of the planar light source according to the first embodiment taken along line III-III in FIG. 1.

FIG. 3 is a cross-sectional view of the planar light source according to the embodiment taken along line III-III in FIG. 1.

As shown in FIG. 1 to FIG. 3, the planar light source 1 according to the present embodiment has a wiring substrate 200, and a light emitting module 100 is disposed on the wiring substrate 200. In the light emitting module 100, a light guide member 20 and light sources 30 are disposed. The light guide member 20 is disposed on the wiring substrate 200, and the light sources 30 are mounted on the wiring substrate 200.

In the wiring substrate 200, a wiring layer 202 and a connection layer 203 that electrically connects the wiring layer 202 and the light sources 30 are provided in an insulating base material 201. In FIG. 3, only one wiring layer 202 is shown, but multiple wiring layers 202 can be disposed. An adhesive sheet 205 and a light reflecting sheet 206 are disposed between the wiring substrate 200 and the light guide member 20. The adhesive sheet 205 adheres the wiring substrate 200 and the light reflecting sheet 206. The light reflecting sheet 206 reflects a portion of the light emitted from a light source 30.

For the light reflecting sheet 206, a resin sheet containing a large number of air bubbles (e.g., foamed resin sheet), a resin sheet containing a light diffusing material, or the like can be used. For the resin used as the light reflecting sheet 206, a thermoplastic resin, such as an acrylic resin, polycarbonate resin, cyclic polyolefin resin, polyethylene terephthalate resin, or polyester resin, or a thermosetting resin, such as an epoxy resin or silicone resin, can be used. For the light diffusing material, any known appropriate material, such as titanium oxide, silica, alumina, zinc oxide, or glass, can be used.

On the upper face of the wiring substrate 200, a light reflecting layer having light reflectivity for the light emitted from the light sources 30 can further be disposed, and in this case, the adhesive layer 205 is adhered to the light reflecting layer. Alternatively, the light reflecting layer can be disposed between the light guide member 20 described later and the light reflecting sheet 206, for example, on the upper face of the light reflecting sheet 206. This allows the light reflecting layer to scatter a portion of the light that is emitted from the light sources 30 and propagates in the light guide member 20, thereby facilitating the extraction of light from the upper face of the light guide member 20. Such a light reflecting layer can have a film or dot shape. The light reflecting layer can extend into the light source placement parts 22 of the light guide member 20 described later in the schematic top view. Preferably, the light reflecting layer is extended to the positions that overlap the light sources 30 in the schematic top view, i.e., between the light sources 30 and the wiring substrate 200. This can hinder the wiring substrate 200 from absorbing a portion of the light emitted from the light sources 30, thereby moderating the luminance decline around the light sources 30.

For the light reflecting layer, for example, a resin containing any known appropriate light diffusing material, such as titanium oxide, silica, alumina, zinc oxide, or glass, can be used. For the resin used as the light reflecting layer, similarly to that used as the light reflecting sheet 206, a thermoplastic or thermosetting resin, for example, can be used. For the resin used as the light reflecting layer, a UV curable resin can alternatively be used.

The light guide member 20 is formed of a light transmissive material, and is plate shaped, for example. For the material used as the light guide member 20, for example, a thermoplastic resin, such as an acrylic resin, polycarbonate resin, cyclic polyolefin resin, polyethylene terephthalate resin, or polyester resin, a thermosetting resin, such as an epoxy resin or silicone resin, or glass can be used. In the light guide member 20, sectioning grooves 21, and emission regions R defined by the sectioning grooves 21 (i.e., the sectioning grooves 21 section the emission regions R), light source placement parts 22 positioned in the emission regions R, and light adjusting holes 23 each provided between the light source placement parts 22 and corresponding one of the sectioning grooves 21 in the schematic top view are formed. The thickness of the light guide member 20 is, for example, preferably 200 μm to 800 μm.

In the present disclosure, for the purpose of explanation, an XYZ orthogonal coordinate system is employed. The direction in which the wiring substrate 200 and the light guide member 20 are layered is denoted as the "Z direction" and the directions in which the emission regions R spread are denoted as the "X direction" and the "Y direction." With respect to the Z direction, the direction from the wiring substrate 200 to the light guide member 20 will also be denoted as the "upward direction" and the opposite direction will also be denoted as the "downward direction." These expressions, however, are used for the sake of convenience, and have nothing to do with the direction of gravity. Viewing of an object from the upper side will be expressed as "in the schematic top view."

In the schematic top view, the sectioning grooves 21 form a lattice shape extending in the X direction and the Y direction, individually surrounding the emission regions R. The formation of the sectioning grooves 21 is not limited to a lattice, as long as they can optically divide the emission regions R to a practically sufficient extent. For example, the sectioning grooves do not have to be provided at the lattice points. This allows the light from adjacent emission regions R to be collected in the regions including no sectioning groove, thereby inhibiting the corners of the emission regions R from becoming less luminous. The explanation will be given below using a single emission region R, but similarly applies to the other emission regions R.

The width of a sectioning groove 21, for example, can be set to about 5% at most of the width of an emission region R. In the case of disposing the sectioning member 21a described later in the sectioning groove 21, it is preferable to set the width of the sectioning groove 21 to make it easy to dispose the sectioning member 21a. The sectioning groove 21 can occupy any appropriate percentage of the light guide member 20 in the thickness direction (Z direction). For example, in the case of reducing light leakage between adjacent emission regions R, the sectioning groove 21 preferably occupies at least 50% of the thickness of the light guide member 20, more preferably at least 70%, particularly preferably at least 90%.

As will be explained later with reference to variations of the embodiment, each sectioning groove 21 can be formed on the upper face 20a or the lower face 20b of the light guide member 20, formed to pass through the light guide member 20 in the Z direction, formed as a shape in which a through groove is partially closed, or as a hollow space not reaching the upper face 20a or the lower face 20b of the light guide member 20. A hollow sectioning groove 21 can be formed, for example, by adhering together a light guide plate whose upper face has a groove and a light guide plate whose lower face has a groove by using a light transmissive adhesive sheet. The same material as that used for the light guide member 20 is preferably used for such an adhesive sheet so as to reduce a possibility that any interface between the layers is created. In the present embodiment, for example, each sectioning groove 21 is formed on the upper face 20a of the light guide member 20.

The inside of each sectioning groove 21 can be an air layer, or include a sectioning member 21a containing a light reflecting material. For the light reflecting material, for example, a metal or a resin containing a light diffusing material can be used. For the resin used as the light reflecting material, a thermoplastic resin, such as an acrylic resin, polycarbonate resin, cyclic polyolefin resin, polyethylene terephthalate resin, or polyester resin, or a thermosetting resin, such as an epoxy resin or silicone resin, can be used. For the light diffusing material, any known appropriate material, such as titanium oxide, silica, alumina, zinc oxide, or glass can be used. For the metal used as the light reflecting material, for example, platinum (Pt), silver (Ag), rhodium (Rh), or aluminum (Al) can be used. Each sectioning member 21a can be formed as a layer along the inner face of a sectioning groove 21, or can fill the sectioning groove 21 in whole or part. The upper part of the sectioning members 21a can protrude higher than the upper face 20a of the light guide member 20. In the present embodiment, for example, each sectioning member 21*a* in the form of a layer is disposed on the inner faces of the sectioning groove 21.

A light source placement part 22 is a space in which a light source 30 is disposed. In other words, the light source 30 is disposed in the light source placement part 22. As will be explained later with reference to variations of the embodiment, a light source placement part 22 can be a through hole passing through the light guide member 20 in the Z direction, or a recessed part formed on the lower face 20*b* of the light guide member 20. In the present embodiment, the shape of the light source placement part 22 is a circle in the schematic top view, but can be, for example, an ellipse or a polygon, such as a triangle, quadrilateral, hexagon, or octagon.

In the present embodiment, for example, each light source placement part 22 is a through hole. A first light transmissive member 25 is provided in the light source placement part 22 so as to embed the light source 30 disposed therein. For the first light transmissive member 25, for example, a light transmissive resin material can be used. For the resin material, similarly to the light guide member 20, a thermoplastic resin or thermosetting resin can be used.

A first light adjusting member 26 is provided on the first light transmissive member 25. The first light adjusting member 26 reflects a portion while transmitting a portion of the light emitted from the light source 30 that transmitted through the first light transmissive member 25. The first light adjusting member 26 can be formed with, for example, a resin material containing a light diffusing material, or a metal material. For example, for the resin material, a silicone resin, epoxy resin, or a resin combining these can be used. For the light diffusing material, any known appropriate material, such as titanium oxide, silica, alumina, zinc oxide, or glass can be used. A dielectric multilayer film can alternatively be used for the first light adjusting member 26. In the present embodiment, for example, the first light adjusting member 26 is disposed in the form of a film, but can be disposed as dots. Moreover, the first light adjusting member 26 in the present embodiment covers the entire upper face of the first light transmissive member 25 in the schematic top view, but a portion of the upper face of the first light transmissive member 25 can be exposed from the first light adjusting member 26.

A first light reflecting member 27 in the form of a film is disposed at the bottom of each light source placement part 22, i.e., under the first light transmissive member 25. The first light reflecting member 27 is formed with a light reflecting material, such as a metal or a resin containing a light diffusing material, similarly to the light reflecting material contained in the sectioning member 21*a*.

Instead of the first light reflecting member 27, the light reflecting sheet 206 on the wiring substrate 200 can be extended into the light source placement part 22 of the light guide member 20 in the schematic top view. In this case, preferably, the light reflecting sheet 206 is extended to a position overlapping the light source 30 in the schematic top view, i.e., between the light source 30 and the wiring substrate 200. This can hinder the wiring substrate 200 from absorbing a portion of the light emitted from the light sources 30, thereby moderating the luminance decline around the light sources 30.

The light source 30 can be a light emitting element by itself, or a structure body in which a light emitting element and an optical member such as a wavelength conversion member are combined. As will be explained later with reference to variations of the embodiment, the light source 30 can take a variety of forms.

In the present embodiment, each light source 30 includes a light emitting element 31, a cover member 33, a second light transmissive member 34, and a second light adjusting member 35. The light emitting element 31 includes at least a semiconductor structure body and a pair of positive and negative electrodes. The light emitting element 31 is, for example, a light emitting diode (LED), and emits, for example, blue light. The semiconductor structure body can include, for example, $In_xAl_yGa_{1-x-y}N$ ($0 \leq x$, $0 \leq y$, $x+y \leq 1$). The light emitting element 31 has a first face 31*a* on which a pair of positive and negative electrodes is disposed, and a second face 31*b* that opposes the first face 31*a*.

In the semiconductor structure body of the light emitting element 31, a light emitting diode structure body is achieved by stacking at least a p-type semiconductor layer, an emission layer, and an n-type semiconductor layer, for example. The emission layer can have a single active layer, such as a double heterostructure body or a single quantum well (SQW) structure body, or can have a group of active layers such as a multi-quantum well (MQW) structure body. The emission layer can emit visible light or ultraviolet light. Examples of visible light include at least blue light to red light. A semiconductor structure body that includes such an emission layer can include, for example, $In_xAl_yGa_{1-x-y}N$ ($0 \leq x$, $0 \leq y$, $x+y \leq 1$).

The light emitting element 31 can include two or more emission layers in the semiconductor structure body. For example, the semiconductor structure body can be one that includes two or more emission layers between an n-type semiconductor layer and a p-type semiconductor layer, or one formed by repeating two or more structure bodies each successively stacking an n-type semiconductor layer, an emission layer, and a p-type semiconductor layer. Two or more emission layers can include those that emit light of different colors or the same color. The same emission color can be a range of emission colors that can be deemed as the same for the purpose of use. For example, there can be variation of about several nanometers in the dominant wavelength of each emission color. A combination of emission colors can be suitably selected. Examples of color combinations in the case of two emission layers include blue light and blue light, green light and green light, red light and red light, ultraviolet light and ultraviolet light, blue light and green light, blue light and red light, green light and red light, or the like.

The cover member 33 is, for example, a resin material containing a light diffusing material, and is disposed in the surrounding of the lower part of the light emitting element 31. Specifically, for the cover member 33, a silicone or epoxy resin containing a light diffusing material, such as titanium oxide, silica, alumina, zinc oxide, or glass can be used. A planar light source 1 is provided with a bonding material 40 such as solder. The bonding material 40 connects the pair of positive and negative electrodes of the light emitting element 31 to the connection layer 203 of the wiring substrate 200, but can connect to the wiring layer 202 without via the connection layer 203.

The second light transmissive member 34 is disposed on the upper part of, around and above the light emitting element 31. The second light transmissive member 34 is formed of a light transmissive resin material that can contain a phosphor, but does not have to contain. For the resin material used as the second light transmissive member 34, for example, an epoxy resin, silicone resin, or a resin mixing these can be used. In the case in which the second light transmissive member 34 contains a phosphor, the second light transmissive member 34 serves as a wavelength conversion layer.

For the phosphors, yttrium aluminum garnet-based phosphors (e.g., $Y_3(Al,Ga)_5O_{12}:Ce$), lutetium aluminum garnet-based phosphors (e.g., $Lu_3(Al,Ga)_5O_{12}:Ce$), terbium aluminum garnet-based phosphors (e.g., $Tb_3(Al,Ga)_5O_{12}:Ce$), β-SiAlON phosphors (e.g., $(Si,Al)_3(O,N)_4:Eu$), α-SiAlON phosphors (e.g., $Mz(Si,Al)_{12}(O,N)_{16}$ where $0<z\leq 2$ and M is an element selected from the group consisting of Li, Mg, Ca, Y, and lanthanide elements excluding La and Ce), nitride-based phosphors, such as CASN-based phosphors (e.g., $CaAlSiN_3:Eu$) or SCASN-based phosphors (e.g., $(Sr,Ca)AlSiN_3:Eu$), fluoride-based phosphors, such as KSF-based phosphors (e.g., $K_2SiF_6:Mn$) or MGF-based phosphors (e.g., $3.5MgO.0.5MgF_2.GeO_2:Mn$), or quantum dot phosphors can be used.

The second light transmissive member 34 can contain several types of phosphors. For example, containing a phosphor that absorbs blue light and emits yellow light and a phosphor that absorbs blue light and emits red light allows the light source 30 to emit white light. The second light transmissive member 34 can contain a light diffusing material to the extent not to shield light. The content of the light diffusing material in the second light transmissive member 34 can be adjusted such that the transmittance of the second light transmissive member 34 for the light emitted from the light emitting element 31 is 50% to 99%, preferably 70% to 90%. For the light diffusing material, for example, titanium oxide, silica, alumina, zinc oxide, or glass can be used.

The second light adjusting member 35 is disposed on the upper face of the second light transmissive member 34. The second light adjusting member 35, similarly to the first light adjusting member 26, is formed with a light reflecting material, such as a metal or a resin material containing a light diffusing material. The second light adjusting member 35 reflects a portion and transmits a portion of the light entering from the second light transmissive member 34. In the case in which the transmittance of the second light adjusting member 35 for the light emitted from the light emitting element 31 is sufficiently low, for example, 1% to 50%, preferably 3% to 30%, the second light adjusting member 35 serves as a light shielding film, preventing the luminance immediately above the light source 30 from becoming excessively high.

Each light adjusting hole 23, similar to the sectioning grooves 21, can be formed on the upper face 20a or the lower face 20b of the light guide member 20, formed to pass through the light guide member 20 in the Z direction, formed as a shape in which a through hole is partially closed, or formed as a hollow space not reaching the upper face 20a or the lower face 20b of the light guide member 20. In the present embodiment, for example, each light adjusting hole 23 is formed on the upper face 20a of the light guide member 20. In other words, the light adjusting holes 23 reach the upper face 20a of the light guide member 20, but are positioned apart from the lower face 20b of the light guide member 20.

In the present disclosure, the term, "hole," is a general designation for a recessed part and a through hole. In other words, a "hole" can be a recessed part that does not pass through the body (e.g., the light guide member 20) in which it is created, or a through hole that passes through the body. Furthermore, the shape of a "hole" is not limited. In other words, it includes a high aspect ratio shape such as a groove extending in one direction in the schematic top view, a low aspect ratio shape such as a circular or polygonal shape in the schematic top view, and any other regular or irregular shape therebetween. Moreover, the internal structure of a "hole" can also be appropriately selected. In other words, a "hole" includes one having an air layer inside, one having a certain member intentionally provided therein, and one in which an unintended substance has been entered.

In the case of disposing the light transmissive member described later in each light adjusting hole 23, it is preferable to set the opening width of the light adjusting hole 23 such that the light transmissive member is easily disposed. Each light adjusting hole 23 can occupy any percentage in the thickness direction of the light guide member 20. For example, in the case of increasing the amount of the light emitted from the light source 30 that advances towards the corners of the emission region R, the light adjusting holes 23 preferably occupy at least 15%, more preferably at least 25%, particularly preferably at least 50% of the thickness of the light guide member 20.

The inside of each light adjusting hole 23 can be an air layer, or include a light transmissive material disposed therein. In the case in which a light transmissive material is disposed inside the light adjusting hole 23, the refractive index of the light transmissive material is preferably lower than the refractive index of the light guide member 20. Examples of resins for use as the light transmissive material include thermoplastic resins, such as an acrylic resin, polycarbonate resin, cyclic polyolefin resin, polyethylene terephthalate resin, or polyester resin, or thermosetting resins, such as an epoxy resin or silicone resin. Moreover, the light transmissive material can contain a light diffusing material. For the light diffusing material, any known material, such as titanium oxide, silica, alumina, zinc oxide, or glass can be used. The light transmissive material can be disposed in the form of a layer along the inner face of a light adjusting hole 23, or can fill the light adjusting hole 23. In the present embodiment, for example, the inside of each light adjusting hole 23 is an air layer. Thus, the refractive index of the inside of each light adjusting hole 23 is lower than the refractive index of the light guide member 20.

The planar arrangement of the light adjusting holes 23 will be explained next.

For the purpose of explanation, an imaginary first straight line L1 and an imaginary second straight line L2 are established in the emission region R. A first straight line L1 is a straight line connecting the center 30c of the light source 30 and a farthest point 21b in the sectioning groove 21 that is farthest from the center 30c of the light source 30, in the schematic top view. In the case in which the shape of each emission region R is polygonal in the schematic top view, a first straight line 1 can be a straight line that connects the center 30c of the light source 30 and a corner of the emission region R. A second straight line L2 is a straight line connecting the center 30c of the light source 30 and a closest point 21c in the sectioning groove 21 that is closest from the center 30c of the light source 30, in the schematic top view.

The "center of the light source" is a geometric center in the schematic top view, and in the case in which the shape of the light source 30 is quadrilateral, for example, the center 30c is the intersection of the diagonal lines of the light source 30. "A farthest point 21b in the sectioning groove that is farthest from the center of the light source" means a point in the sectioning groove 21 (i.e., sectioning groove surrounding the light source 30) that is farthest from the center 30c of the light source 30, where other sectioning grooves 21 surrounding only other light sources 30 are not taken into consideration. In the case in which the shape of the emission region R is quadrilateral, a farthest pint 21b is a corner of the sectioning groove 21. In the case in which the shape of the emission region R is quadrilateral and the center 30c of the light source 30 coincides with the center of the emission region R in the schematic top view, there are four first straight lines L1 and four second straight lines L2.

In the schematic top view, each light adjusting hole 23 is disposed in the position to intersect with a first straight line L1. In the present embodiment, the light adjusting holes 23 are not positioned on any second straight line L2. The shape of each emission region R is quadrilateral in the schematic top view, and the light adjusting holes 23 are provided such that one light adjusting hole is positioned between the light source 30 and each corner of the emission region R.

In the schematic top view, each light adjusting hole 23 has the shape of a plano-concave-type concave lens. More specifically, each light adjusting hole 23 has a first lateral face 23a positioned closer to the light source 30 side, and a second lateral face 23b positioned opposite to the first lateral face 23a. The second lateral face 23b is positioned closer to a farthest point 21b of the sectioning groove 21. The first lateral face 23a is a plane orthogonal to a first straight line L1, and the second lateral face 23b is a concave face so as to be curved inward of the light adjusting hole 23. The curvature of such a second lateral face 23b is, for example, preferably 0.3 to 1.3, more preferably 0.35 to 1.0.

In the first direction V parallel to a first straight line L1, the width W1 of a light adjusting hole 23 on the first straight line L1 is smaller than the width W2 of the light adjusting hole 23 at a position P1 distant from the first straight line L1. In other words, W1<W2. The width W1 is, for example, the minimum value of the width of the light adjusting hole 23 in the first direction V. At least one of the normal lines N2 normal to the second lateral face 23b is oblique to the first direction V.

The operation of the planar light source according to the present embodiment will be explained next.

FIG. 2 shows several examples of optical paths T.

When power is supplied to the light source 30 via the wiring substrate 200, the light source 30 emits light. The light emitted from the light source 30 is introduced into the light guide member 20 via the first light transmissive member 25, and then propagates in the light guide member 20 while being reflected by the upper face 20a and the lower face 20b of the light guide member 20.

A portion of the light propagated in the light guide member 20 reaches the light adjusting holes 23. Because the refractive index of the inside of each light adjusting hole 23 is lower than the refractive index of the light guide member 20, and the light adjusting holes 23 are concave lens shaped, an optical action similar to that of a regular convex lens results in the light adjusting holes 23 thereby converging the light that passed through the light adjusting holes 23. Accordingly, the light that passed through the light adjusting holes 23 is refracted towards the first straight lines L1 to be collected in the vicinities of the corners of the emission region R. This, as a result, increases the brightness in the corners of the emission region R, thereby reducing luminance non-uniformity in the emission region R. Once the light reaches the sectioning groove 21, further propagation is obstructed by the sectioning groove 21. This may suppress the light from leaking into adjacent emission regions R.

The effect of the embodiment will be explained next.

In the present embodiment, sectioning grooves 21 are formed in the light guide member 20 to section the emission face of the light emitting module 100 into a plurality of emission regions R. In the emission regions R, light source placement parts 22 are respectively formed where light sources 30 are respectively disposed. The majority of the light emitted from the light sources 30 exits through the upper face 20 of the light guide member 20 before reaching the sectioning grooves 21. Accordingly, the majority of the light emitted by a light source 30 exits the light emitting module 100 from the emission region R in which the light source 30 is disposed. This makes it possible to control the luminous intensity per emission region R. As a result, a high contrast image can be displayed when a planar light source according to the embodiment is used as a light source for a liquid crystal display, for example.

In the present embodiment, moreover, light can be refracted using the light adjusting holes 23. Because the corners of the emission regions R are distant from the light sources 30, the corners of the emission regions R can easily be less luminous in the absence of light adjusting holes 23. Accordingly, in the present embodiment, light adjusting holes 23 are formed in the positions to intersect with the first straight lines L1. Accordingly, at least one portion of the light propagating near the first straight lines L1 is converged in the vicinities of the corners of the emission region R by the light adjusting holes 23. This, as a result, can increase the brightness in the corners of the emission regions R, thereby reducing luminance non-uniformity in each emission region R.

Second Embodiment

A second embodiment will be explained next.

Figure 4:
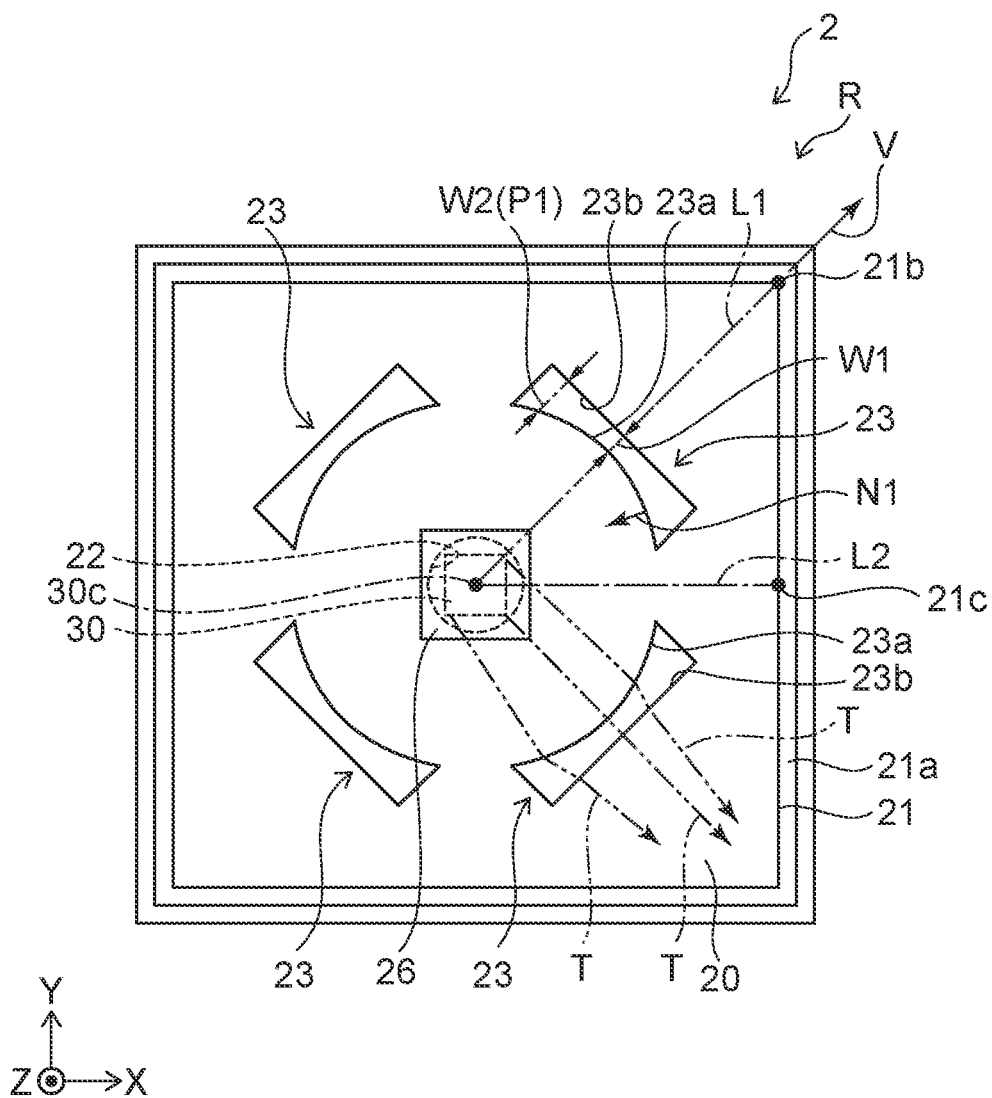
FIG. 4 is a schematic top view of an emission region of a planar light source according to a second embodiment.

FIG. 4 is a schematic top view of one emission region of a planar light source according to the embodiment.

As shown in FIG. 4, in the planar light source 2 according to the present embodiment, each light adjusting hole 23 is also concave lens shaped in the schematic top view. As compared to the first embodiment, the orientation of the light adjusting holes 23 is reversed. In other words, the first lateral face 23a of each light adjusting hole 23 is a concave face so as to be curved inward of the light adjusting hole 23. The second lateral face 23b of each light adjusting hole 23 is a flat face orthogonal to a first straight line L1.

In the schematic top view, each light adjusting hole 23 intersects with a first straight line L1 and is positioned apart from second straight lines L2. In the first direction V parallel to a first straight line L1, the width W1 of a light adjusting hole 23 on the first straight line L1 is smaller than the width W2 of the light adjusting hole 23 at a position P1 distant from the first straight line L1. The width W1 is, for example, the minimum value of the width of the light adjusting hole 23 in the first direction V. Furthermore, at least one of the normal lines N1 normal to the first lateral face 23a are oblique to the first direction V. The present embodiment can also achieve a similar effect to that achieved by the first embodiment. The other elements not described above, the operation, and the effect of the present embodiment are similar to those of the first embodiment.

Third Embodiment

A third embodiment will be explained next.

Figure 5:
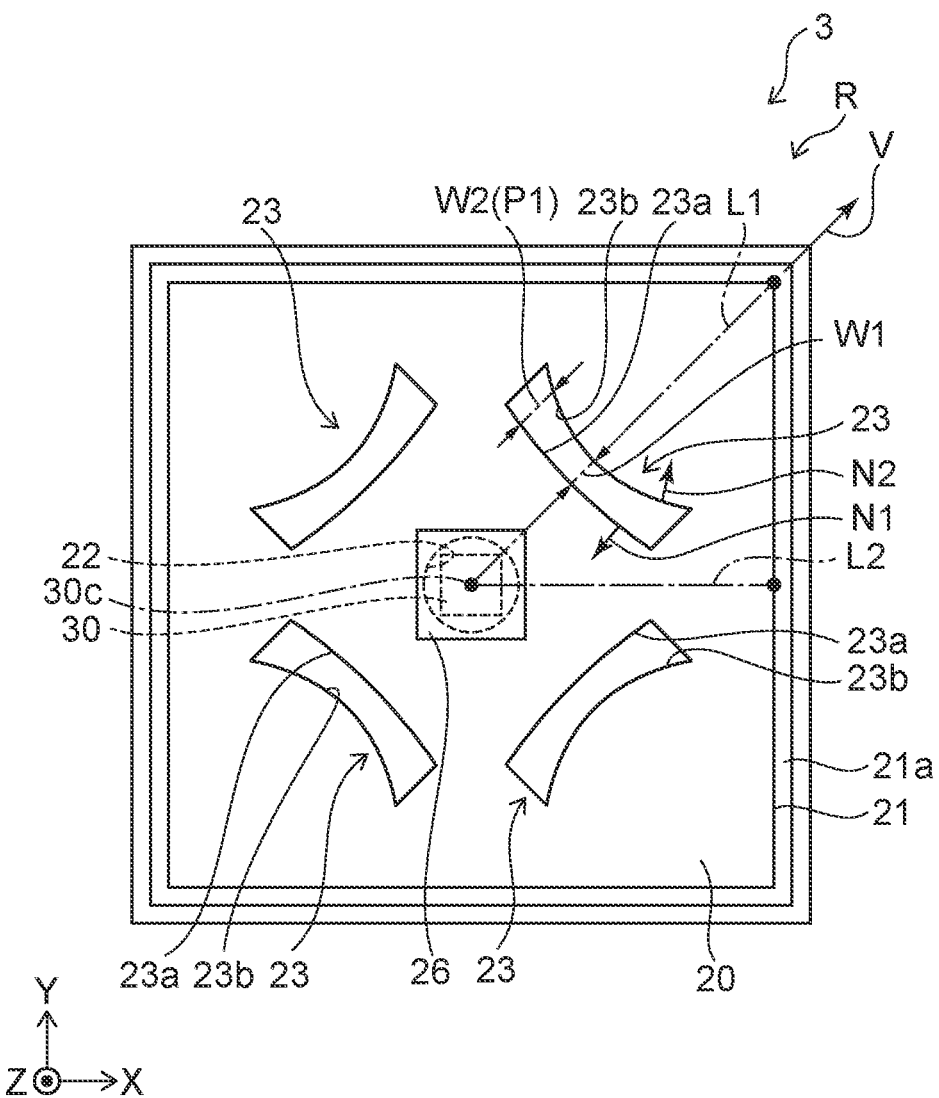
FIG. 5 is a schematic top view of an emission region of a planar light source according to a third embodiment.

FIG. 5 is a schematic top view of one emission region of a planar light source according to the embodiment.

As shown in FIG. 5, the planar light source 3 according to the present embodiment is different from the planar light source 1 according to the first embodiment in that the first lateral face 23a of each light adjusting hole 23 is a convex face so as to be curved outwardly protruding from the light adjusting hole 23. The curvature of the first lateral face 23a is smaller than the curvature of the second lateral face 23b. Accordingly, in the schematic top view, the shape of each light adjusting hole 23 is a concave meniscus-type concave lens.

In the schematic top view, each light adjusting hole 23 intersects with a first straight line L1 and is positioned apart from second straight lines L2. In the first direction V parallel to a first straight line L1, the width W1 of a light adjusting hole 23 on the first straight line L1 is smaller than the width W2 of the light adjusting hole 23 at a position P1 distant from the first straight line L1. The width W1 is, for example, the minimum value of the width of the light adjusting hole 23 in the first direction V. Furthermore, at least one of the normal lines N1 normal to the first lateral face 23a and at least one of the normal lines N2 normal to the second lateral face 23b are oblique to the first direction V. The other elements not described above, the operation, and the effect of the present embodiment are similar to those of the first embodiment.

Fourth Embodiment

A fourth embodiment will be explained next.

Figure 6:
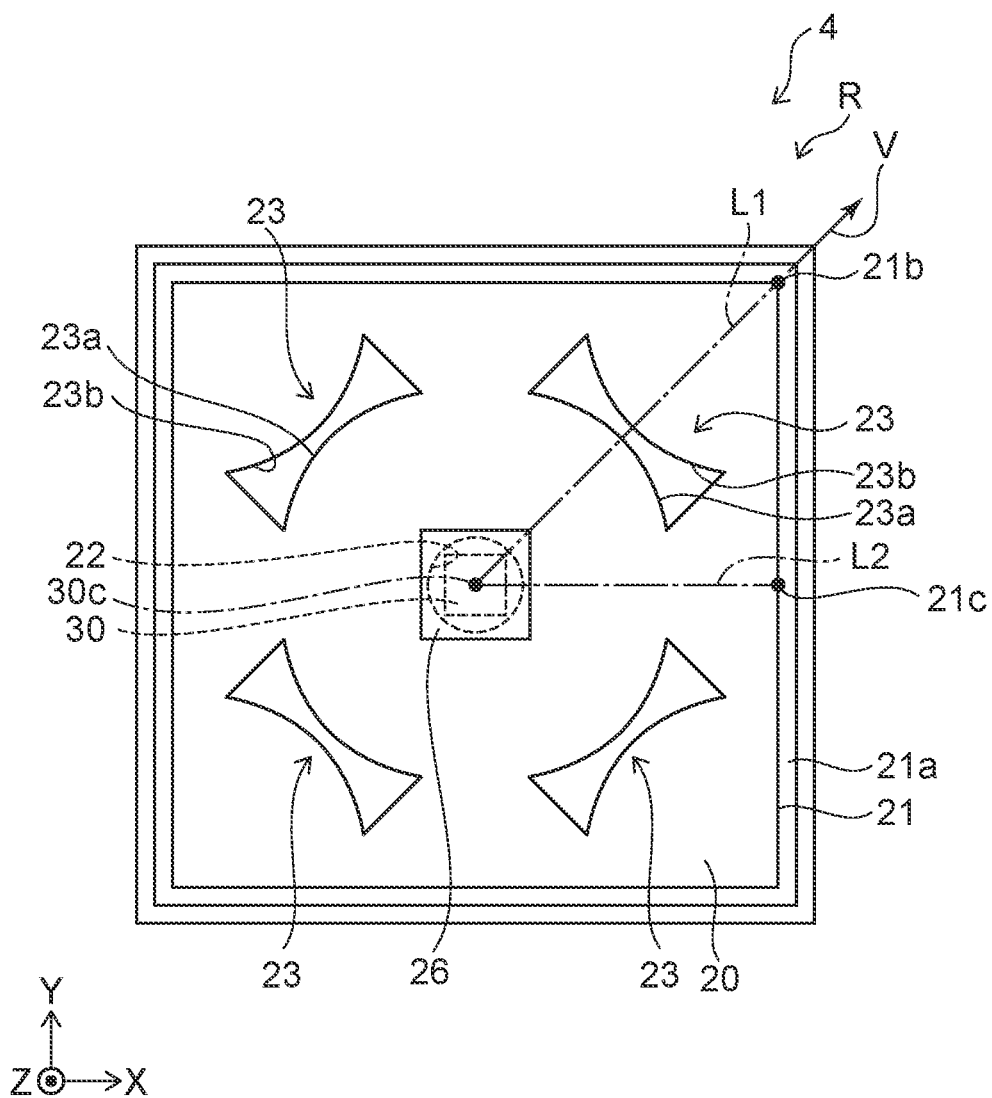
FIG. 6 is a schematic top view of an emission region of a planar light source according to a fourth embodiment.

FIG. 6 is a schematic top view of one emission region of a planar light source according to the embodiment.

As shown in FIG. 6, in the planar light source 4 according to the present embodiment, the shape of each light adjusting hole 23 in the schematic top view is a biconcave-type concave lens. In other words, both the first lateral face 23a and the second lateral face 23b of each light adjusting hole 23 are concave faces so as to be curved inward of the light adjusting hole 23. The other elements not described above, the operation, and the effect of the present embodiment are similar to those of the first embodiment.

Fifth Embodiment

A fifth embodiment will be explained next.

Figure 7:
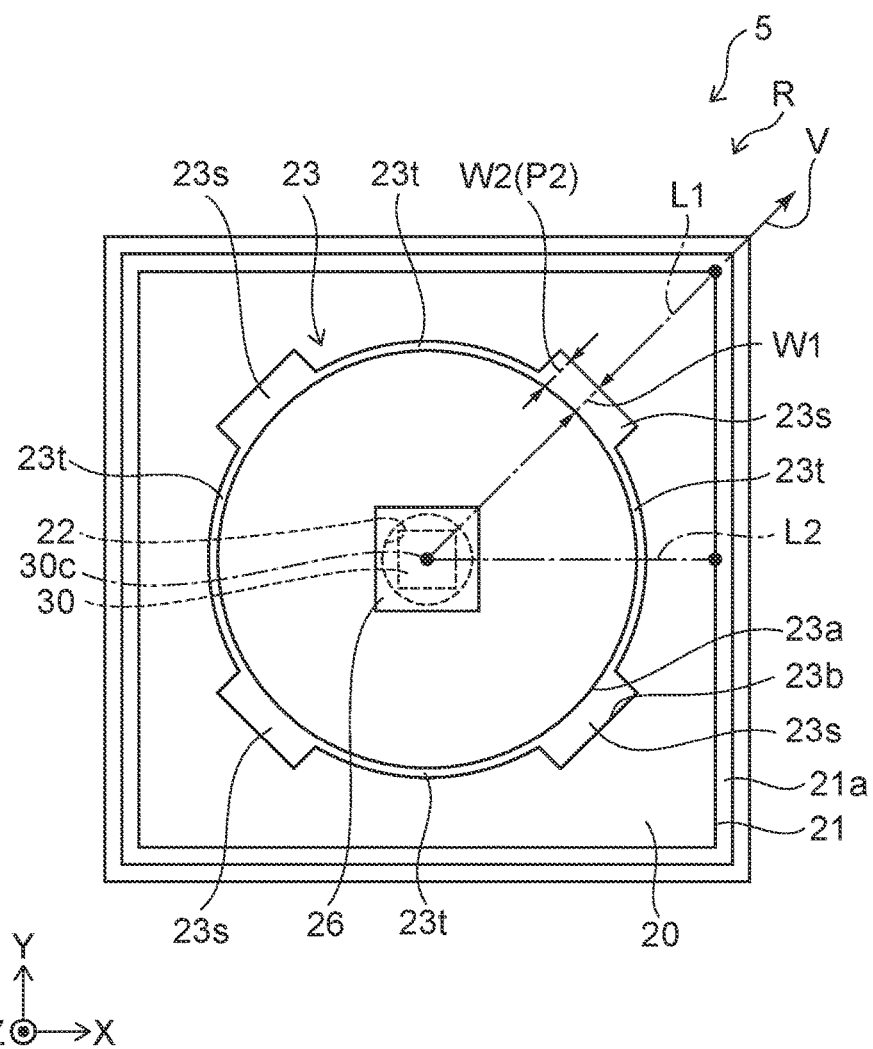
FIG. 7 is a schematic top view of an emission region of a planar light source according to a fifth embodiment.

FIG. 7 is a schematic top view of one emission region of a planar light source according to the embodiment.

As shown in FIG. 7, in the planar light source 5 according to the present embodiment, a single light adjusting hole 23 is provided in each emission region R. In the schematic top view, the shape of the light adjusting hole 23 is annular, surrounding the light source placement part 22 in each emission region. In the light adjusting hole 23, concave lens-shaped parts 23s are provided in the portions that intersect with the first straight lines L1, and linking parts 23t are provided in the portions that intersect with the second straight lines L2. In the present embodiment, the concave lens-shaped parts 23s and the linking parts 23t are provided in four locations each, which are alternately arranged along the circumferential direction of the light adjusting hole 23 and integrally formed.

The shape of each concave lens-shaped part 23s is similar to the shape of the light adjusting hole 23 explained with reference to the second embodiment. Accordingly, an optical action similar to that of a regular concave lens results in each concave lens-shaped part 23s. On the other hand, the width of each linking part 23t is substantially uniform. Accordingly, an optical action does not substantially take place at the linking parts 23t. For example, the width in the direction parallel to the second straight line L2 of a linking part 23t at the portion that intersects with a second straight line L2 is smaller than the width in the first direction of a concave lens-shaped part 23s at the portion that intersects with a first straight line L1 V. The other elements not described above, the operation, and the effect of the present embodiment are similar to those of the first embodiment.

Variations common to the embodiments described above will be explained below.

The first to fourth variations described below are variations related to the shapes of the sectioning grooves 21, the light source placement parts 22, and the light adjusting holes 23 in the up-down direction. The fifth variation is an example in which a wiring substrate 200 is not disposed. The sixth to eleventh variations are variations related to the light sources 30. The drawings showing the variations below are schematic, in which certain elements might be omitted or simplified as appropriate. The embodiments described above and the variations described below can be implemented in combination.

First Variation

Figure 8:
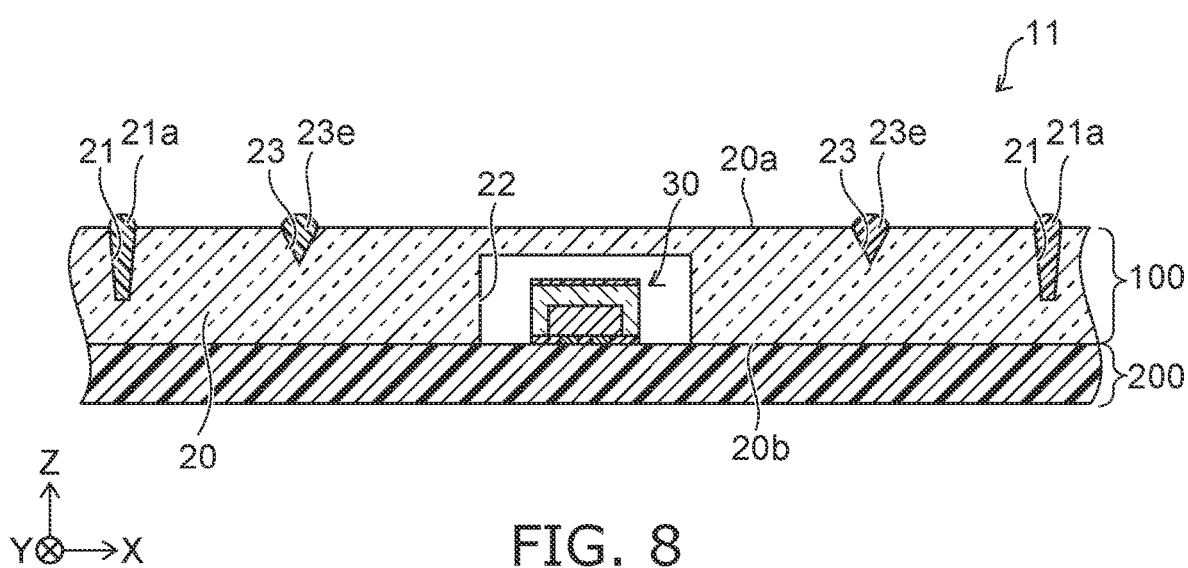
FIG. 8 is a schematic cross-sectional view of a planar light source according to a first variation.

FIG. 8 is a cross-sectional view of a planar light source according to a first variation. As shown in FIG. 8, in the planar light source 11 of this variation, the sectioning groove 21 and the light adjusting holes 23 are formed on the upper face 20a side of the light guide member 20. In other words, the sectioning groove 21 and the light adjusting holes 23 reach the upper face 20a of the light guide member 20, but are positioned apart from the lower face 20b.

The sectioning groove 21 is filled with a sectioning member 21a containing a light reflecting material, and the inside of the sectioning groove 21 is entirely buried under the sectioning member 21a. The light adjusting holes 23 are filled with a light transmissive member 23e formed of a light transmissive material such as a transparent resin, and the inside of each light adjusting hole 23 is entirely buried under the light transmissive member 23e. The refractive index of the light transmissive member 23e is lower than the refractive index of the light guide member 20. The upper edge of the sectioning member 21a and the upper edges of the light transmissive members 23e are positioned higher than the upper face 20a of the light guide member 20. The light source positing part 22 is a recessed part formed on the lower face 20b of the light guide member 20. The light source placement part 22 can be entirely or partially filled with a first light transmissive member 25, or can be an air layer. In this example, both the sectioning groove 21 and the light adjusting holes 23 are illustrated such that the distance between the inner lateral faces of each sectioning groove 21 and the distance between the inner lateral faces of each light adjusting hole 23 increase towards the top, but the configurations are not limited thereto. The distance between the inner lateral faces of each sectioning groove 21 and the distance between the inner lateral faces of each light adjusting hole 23 can be increased towards the bottom, or remain substantially parallel in the Z direction.

Second Variation

Figure 9:
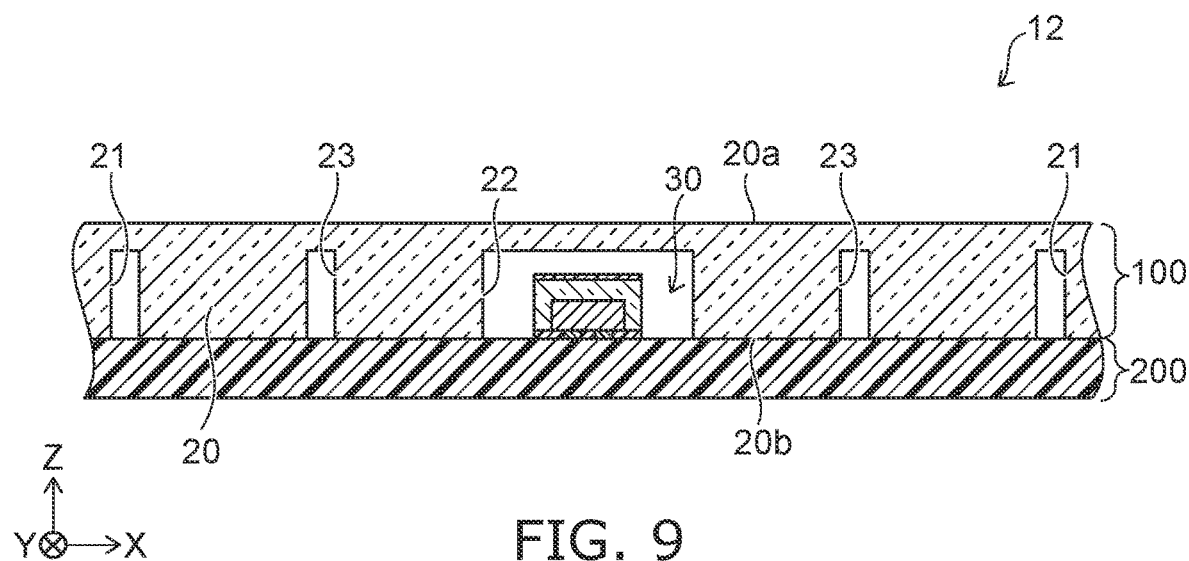
FIG. 9 is a schematic cross-sectional view of a planar light source according to a second variation.

FIG. 9 is a cross-sectional view of a planar light source according to a second variation.

As shown in FIG. 9, in the planar light source 12 of this variation, the sectioning groove 21 and the light adjusting holes 23 are formed on the lower face 20b of the light guide member 20. In other words, the sectioning groove 21 and the light adjusting holes 23 are positioned apart from the upper face 20a of the light guide member 20, but reach the lower face 20b. The inside of the sectioning groove 21 and the light adjusting holes 23 are air layers. The light source placement part 22 is a recessed part formed on the lower face 20b of the light guide member 20. The light source placement part 22 can be entirely or partially filled with a first light transmissive member 25, or can be an air layer. FIG. 9 shows an example in which the inner lateral faces of each sectioning groove 21 and the inner lateral faces of each light adjusting hole 23 are substantially parallel in the Z direction, however the configurations are not limited thereto. The distance between the inner lateral faces of each sectioning groove 21 and the distance between the inner lateral faces of each light adjusting hole 23 can be increased towards the top or bottom.

Third Variation

Figure 10:
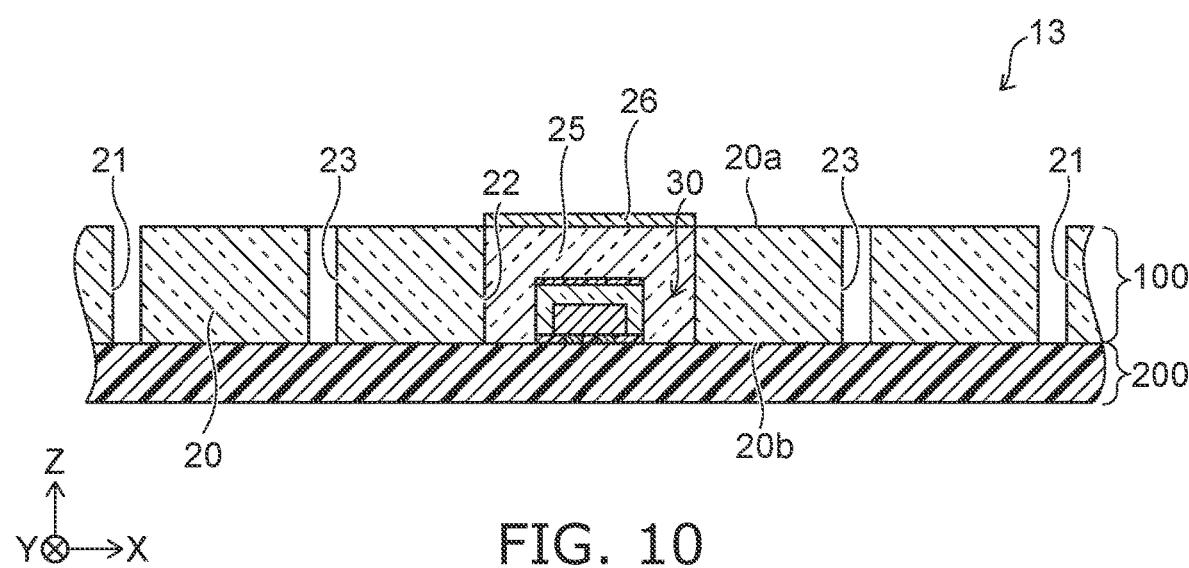
FIG. 10 is a schematic cross-sectional view of a planar light source according to a third variation.

FIG. 10 is a cross-sectional view of a planar light source according to a third variation.

As shown in FIG. 10, in the planar light source 13 of this variation, the sectioning groove 21 and the light adjusting holes 23 pass through the light guide member 20 in the up-down direction (Z direction). In other words, the sectioning groove 21 and the light adjusting holes 23 reach both the upper face 20a and the lower face 20b of the light guide member 20. The inside of the sectioning groove 21 and the inside of the light adjusting holes 23 are air layers. The sectioning groove 21 and the light adjusting holes 23 can be partially closed. The light source placement part 22 also passes through the light guide member 20 in the up-down direction (Z direction). A first light transmissive member 25 fills the light source placement part 22. On the first light transmissive member 25, a first light adjusting member 26 is disposed. The first light transmissive member 25 and the first light adjusting member 26 do not have to be provided, or only the first light transmissive member 25 can be provided without providing the first light adjusting member 26. FIG. 10 shows an example in which the inner lateral faces of each sectioning groove 21 and the inner lateral faces of each light adjusting hole 23 that pass through the light guide member 20 are substantially parallel in the Z direction, however, the configurations are not limited thereto. The distance between the inner lateral faces of each sectioning groove 21 and the distance between the inner lateral faces of each light adjusting hole 23 can be increased towards the top, or can be increased toward the bottom.

Fourth Variation

Figure 11:
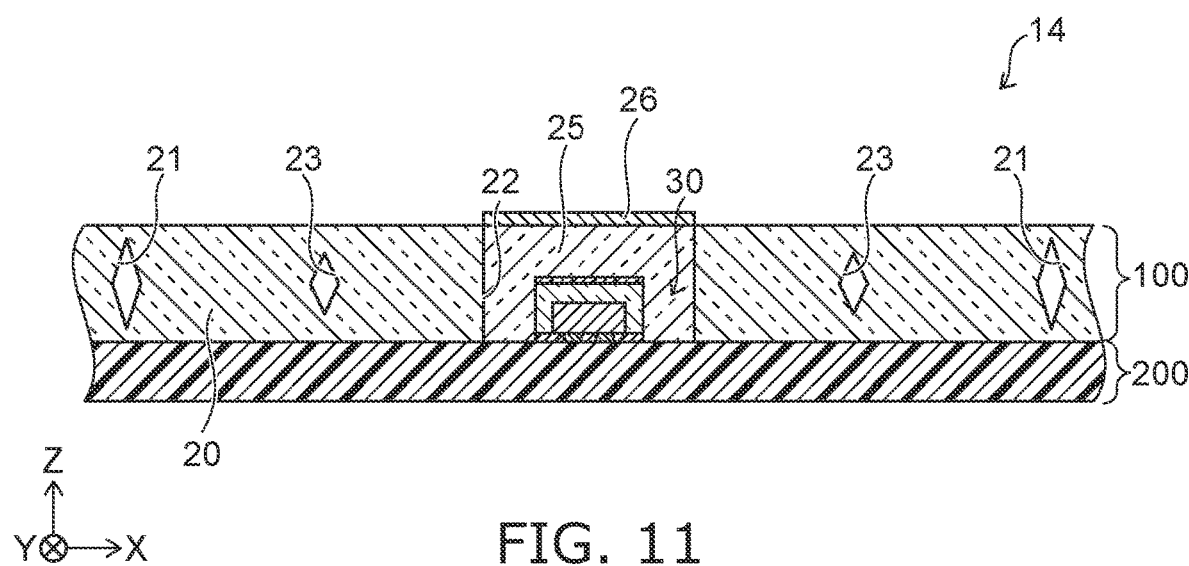
FIG. 11 is a schematic cross-sectional view of a planar light source according to a fourth variation.

FIG. 11 is a cross-sectional view of a planar light source according to a fourth variation.

As shown in FIG. 11, in the planar light source 14 of this variation, the sectioning groove 21 and the light adjusting holes 23 are formed in the light guide member 20. In other words, the sectioning grove 21 and the light adjusting holes 23 are positioned apart from both the upper face 20a and the lower face 20b of the light guide member 20. The inside of the sectioning groove 21 and the inside of the light adjusting holes 23 are air layers. The light source placement part 22 passes through the light guide member 20 in the up-down direction (Z direction).

Such a light guide member 20 can include a lower light guide plate and an upper light guide plate. The upper face of the lower light guide plate is provided with a recessed part that will become the lower portion of the sectioning groove 21, recessed parts that will become the lower portions of the light adjusting holes 23, and a through hole that will become the lower portion of the light source placement part 22. The lower face of the upper light guide plate is provided with a recessed part that will become the upper portion of the sectioning groove 21, recessed parts that will become the upper portions of the light adjusting holes 23, and a through hole that will become the upper portion of the light source placement part 22. Such a light guide member 20 can be formed by adhering a lower light guide plate and an upper light guide plate together. A first light transmissive member 25 entirely or partially fills the light source placement part 22. On the first light transmissive member 25, a first light adjusting member 26 is provided.

Fifth Variation

Figure 12:
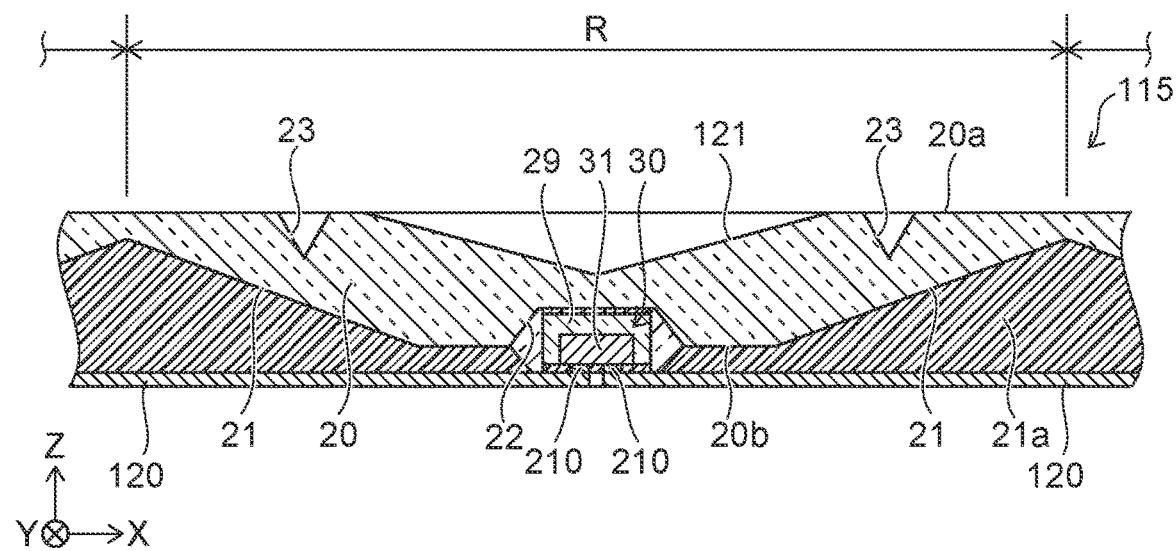
FIG. 12 is a schematic cross-sectional view of a light emitting module according to a fifth variation.

FIG. 12 is a cross-sectional view of a light emitting module according to a fifth variation.

As shown in FIG. 12, in the light emitting module 115 of this variation, no wiring substrate 200 is provided. In the light guide member 20, the light source placement part 22 is a recessed part formed on the lower face 20b of the light guide member 20. The light source 30 is disposed in the light source placement part 22, and an affixing member 29 is provide in the space between the light source 30 and the light guide member 20 in the light source placement part 22. The affixing member 29 is, for example, formed of a light transmissive resin material. The light source 30 is fixed to the light guide member 20 via the affixing member 29.

The sectioning groove 21 is formed on the lower face 20b of the light guide member 20, and a sectioning member 21a is provided inside thereof. The sectioning member 21a reaches the light source placement part 22. A pair of wirings 120 is disposed on the lower face of the sectioning member 21a. The pair of wirings 120 is electrically connected to the pair of positive and negative electrodes of the light emitting element 31 of the light source 30 via a pair of external electrode members 210. The light adjusting holes 23 are formed at the upper face 20a of the light guide member 20. A recessed part 121 is created in the region of the upper face 20a of the light guide member 20, the region of the upper face 20a including the area immediately above the light source placement part 22. A first light adjusting member 26 can be provided in the recessed part 121, but does not have to be provided.

The light emitting module 115 of this variation constructs a planar light source by being mounted on an external substrate (not shown). Power is supplied to the light source 30 from the external substrate.

Sixth Variation

Figure 13A:
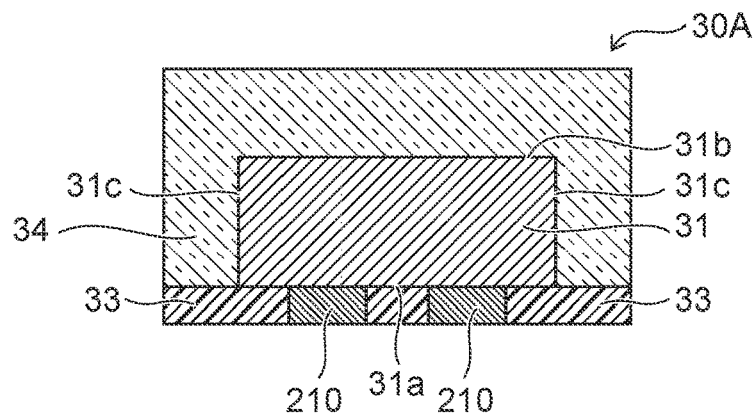
FIG. 13A is a schematic cross-sectional view of a light source according to a sixth variation.

FIG. 13A is a cross-sectional view of a light source according to a sixth variation.

As shown in FIG. 13A, in the light source 30A of this variation, a light emitting element 31, a cover member 33, and a second light transmissive member 34 are provided. A pair of external electrode members 210 is connected to the pair of positive and negative electrodes disposed on the first face 31a of the light emitting element 31. The cover member 33 is disposed under the first face 31a of the light emitting element 31 around the external electrode members 210. The second light transmissive member 34 covers the lateral faces 31c and the second face 31b of the light emitting element 31. The second light transmissive member 34 can be a wavelength conversion layer containing a phosphor.

Seventh Variation

Figure 13B:
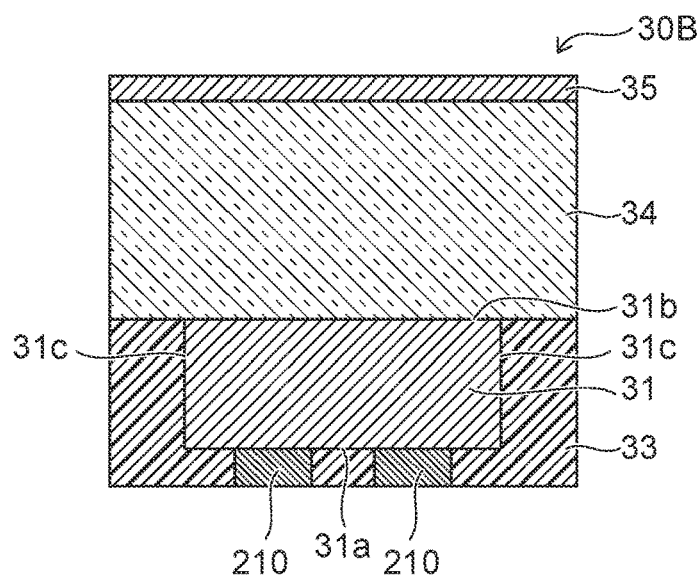
FIG. 13B is a schematic cross-sectional view of a light source according to a seventh variation.

FIG. 13B is a cross-sectional view of a light source according to a seventh variation.

As shown in FIG. 13B, the light source 30B of this variation differs from the light source 30A of the sixth variation in that the cover member 33 covers the lateral faces 31c of the light emitting element 31, the second light transmissive member 34 is disposed on the second face 31b of the light emitting element 31, and a second light adjusting member 35 is disposed on the second light transmissive member 34. In the case in which the transmittance of the second light adjusting member 35 is sufficiently low, the second light adjusting member 35 serves as a light shielding film.

Eighth Variation

Figure 13C:
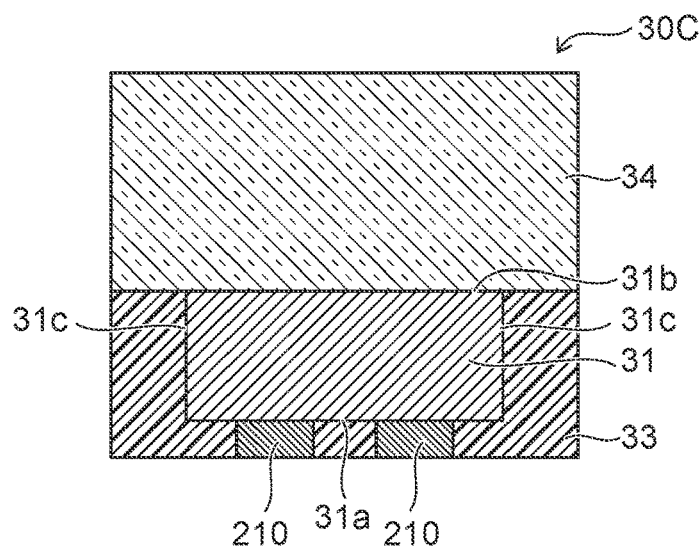
FIG. 13C is a schematic cross-sectional view of a light source according to an eighth variation.

FIG. 13C is a cross-sectional view of a light source according to an eighth variation.

As shown in FIG. 13C, the light source 30C of this variation differs from the light source 30B of the seventh variation in that no second light adjusting member 35 is provided.

Ninth Variation

Figure 14A:
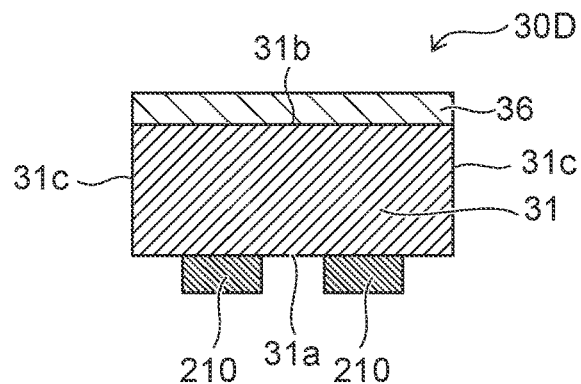
FIG. 14A is a schematic cross-sectional view of a light source according to a ninth variation.

FIG. 14A is a cross-sectional view of a light source according to a ninth variation.

As shown in FIG. 14A, the light source 30D of this variation differs from the light source 30A of the sixth variation in that it does not include any cover member 33 or second light transmissive member 34, but includes a light shielding layer 36. The light shielding layer 36 is disposed on the second face 31b of the light emitting element 31. The light shielding layer 36 is, for example, a metal layer or a distributed Bragg reflector (DBR). The light shielding layer 36 can be formed of a resin containing a light diffusing material.

Tenth Variation

Figure 14B:
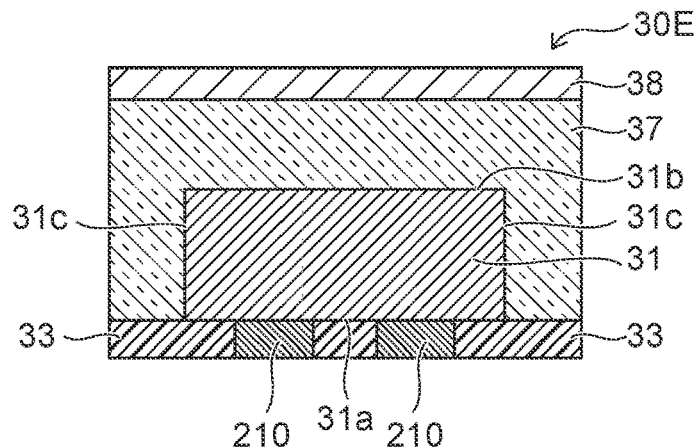
FIG. 14B is a schematic cross-sectional view of a light source according to a tenth variation.

FIG. 14B is a cross-sectional view of a light source according to a tenth variation.

As shown in FIG. 14B, the light source 30E of this variation differs from the light source 30A of the sixth variation in that a light transmissive layer 37 is provided instead of the second light transmissive member 34, and a light shielding film 38 is further provided. The light transmissive layer 37 is, for example, formed of a light transmissive resin layer. The light transmissive layer 37, for example, is substantially from of a phosphor. The light transmissive layer 37 can contain a light diffusing material. The light shielding film 38 is disposed on the light transmissive layer 37. The light shielding film 38 is, for example, a metal layer or a distributed Bragg reflector. The light shielding film 38 can be formed of a resin containing a light diffusing material.

Eleventh Variation

Figure 14C:
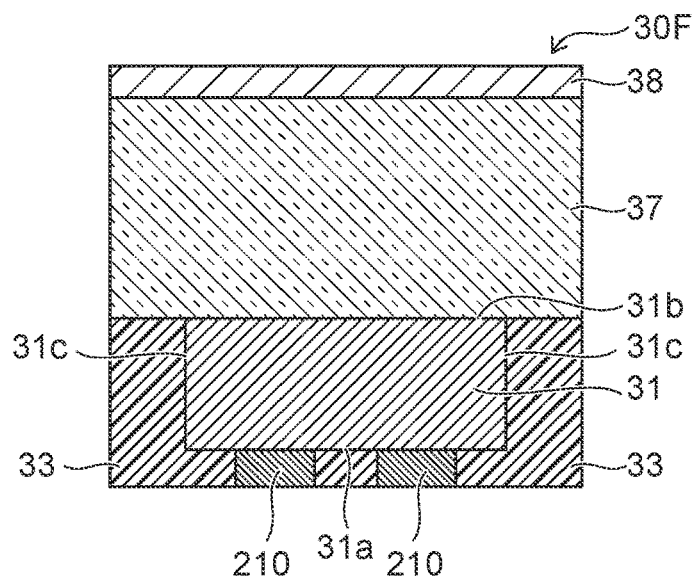
FIG. 14C is a schematic cross-sectional view of a light source according to an eleventh variation.

FIG. 14C is a cross-sectional view of a light source according to an eleventh variation.

As shown in FIG. 14C, the light source 30F of this variation differs from the light source 30E of the tenth variation in that the cover member 33 covers the lateral faces 31c of the light emitting element 31, and the light transmissive layer 37 is disposed on the second face 31b of the light emitting element 31.

In the embodiments and the variations described above, the light guide member 20 was illustrated as a plate-shaped member, but the light guide member 20 is not limited to this. The light guide member 20 can be a layer formed to cover the light sources 30. The light guide member 20 can have a multilayer structure body or as blocks provided per emission region R. Moreover, a light source 30 can have a plurality of light emitting elements. Furthermore, the shape of each emission region R is not limited to quadrilateral, and can be polygonal other than quadrilateral, such as triangular or hexagonal.

What is claimed is:

1. A light emitting module comprising:
   a light guide member comprising:
      an emission region defined by a sectioning groove,
      a light source placement part located in the emission region, and
      a light adjusting hole that, in a schematic top view, is located between the sectioning groove and the light source placement part; and
   a light source disposed in the light source placement part, wherein:
   a refractive index of an inside of the light adjusting hole is lower than a refractive index of the light guide member,
   in the schematic top view, the light adjusting hole is positioned to intersect with a first straight line connecting a center of the light source and a point in the sectioning groove that is farthest from the center of the light source,
   in the schematic top view, no light adjusting hole is positioned on a second straight line connecting the center of the light source and a point in the sectioning groove that is closest to the center of the light source,
   the light adjusting hole has a first lateral face located closer to the light source and a second lateral face located opposite the first lateral face,
   at least one of normal lines to the first lateral face or at least one of normal lines to the second lateral face is oblique to a first direction that is parallel to the first straight line, and
   a width of the light adjusting hole in the first direction at a position on the first straight line is smaller than a width of the light adjusting hole in the first direction at a position distant from the first straight line.

2. The light emitting module according to claim 1, wherein:
   in the schematic top view, a shape of the emission region is quadrilateral, and the first straight line connects the center of the light source and a corner of the emission region.

3. The light emitting module according to claim 2, wherein:
   the light guide member has at least one additional light adjusting hole, and
   in the schematic top view, the light adjusting hole and the additional light adjusting hole are respectively located at positions between the light source and corners of the emission region.

4. The light emitting module according to claim 1, wherein:
   light emitted from the light source is refracted in the light adjusting hole.

5. The light emitting module according to claim 1, wherein:
   an air layer is located inside the light adjusting hole.

6. The light emitting module according to claim 1, wherein:
   in the schematic top view, the second lateral face is concave-shaped so as to be curved inward of the light adjusting hole.

7. The light emitting module according to claim 6, wherein:
   in the schematic top view, the first lateral face is convex-shaped so as to be curved outwardly protruding from the light adjusting hole, and a curvature of the first lateral face is smaller than a curvature of the second lateral face.

8. The light emitting module according to claim 6, wherein:
   the first lateral face extends in a plane orthogonal to the first straight line.

9. The light emitting module according to claim 1, wherein:
   in the schematic top view, the first lateral face is concave-shaped so as to be curved inward of the light adjusting hole.

10. The light emitting module according to claim 1, wherein:
in the schematic top view, the light adjusting hole is concave lens-shaped.

11. The light emitting module according to claim 1, wherein:
the light adjusting hole reaches the upper face of the light guide member, but is positioned apart from the lower face of the light guide member.

12. The light emitting module according to claim 1, wherein:
the light adjusting hole passes through the light guide member from an upper face to a lower face of the light guide member.

13. The light emitting module according to claim 1, further comprising:
a light adjusting member disposed in an area immediately above the light source placement part in an upper face of the light guide member to reflect a portion of light emitted from the light source and transmit a portion of the light emitted from the light source.

14. The light emitting module according to claim 1, wherein:
the light source comprises a light emitting element, and
the light emitting element has a first face on which a pair of positive and negative electrodes are formed, and a second face located opposite the first face.

15. The light emitting module according to claim 14, wherein:
the light emitting element further comprises a light shielding layer disposed on the second face.

16. The light emitting module according to claim 14, wherein:
the light source further comprises:
a light transmissive layer disposed at least on the second face of the light emitting element, and
a light shielding film disposed on the light transmissive layer.

17. The light emitting module according to claim 14, wherein:
the light source further comprises a wavelength conversion layer disposed at least on the second face of the light emitting element.

18. The light emitting module according to claim 17, wherein:
the light source further comprises a light shielding film disposed on the wavelength conversion layer.

19. The light emitting module according to claim 1, wherein:
an upper face and a lower face of the light guide member are flat along the second straight line.

20. A planar light source comprising:
a light emitting module according to claim 1, and
a wiring substrate, wherein:
the light guide member is disposed on the wiring substrate, and the light source is mounted on the wiring substrate.

* * * * *